US009531845B2

(12) United States Patent
Huang

(10) Patent No.: US 9,531,845 B2
(45) Date of Patent: Dec. 27, 2016

(54) METHOD AND APPARATUS COMPATIBLE WITH MULTI-VERSION FOR STORING WIRELESS RESOURCE

(75) Inventor: Jun Huang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 102 days.

(21) Appl. No.: 14/394,174

(22) PCT Filed: Jun. 14, 2012

(86) PCT No.: PCT/CN2012/076942
§ 371 (c)(1),
(2), (4) Date: Oct. 13, 2014

(87) PCT Pub. No.: WO2013/155779
PCT Pub. Date: Oct. 24, 2013

(65) Prior Publication Data
US 2015/0055585 A1 Feb. 26, 2015

(30) Foreign Application Priority Data

Apr. 16, 2012 (CN) .......................... 2012 1 0109020

(51) Int. Cl.
| | |
|---|---|
| H04W 4/00 | (2009.01) |
| H04L 29/06 | (2006.01) |
| H04W 72/00 | (2009.01) |
| H04L 29/08 | (2006.01) |
| H04W 72/04 | (2009.01) |

(52) U.S. Cl.
CPC .............. *H04L 69/08* (2013.01); *H04L 69/321* (2013.01); *H04W 72/00* (2013.01); *H04W 72/042* (2013.01)

(58) Field of Classification Search
CPC ...... H04L 69/08; H04L 69/321; H04W 72/042
(Continued)

(56) References Cited

U.S. PATENT DOCUMENTS 9,313,755 B2 * 4/2016 Chen .................... H04B 7/2603
2002/0154612 A1 * 10/2002 Massie .................. H04L 1/1809
370/329
(Continued)

FOREIGN PATENT DOCUMENTS

| CN | 101505513 A | 8/2009 |
|---|---|---|
| CN | 102055723 A | 5/2011 |
| WO | 2009050212 A1 | 4/2009 |

OTHER PUBLICATIONS

International Search Report in international application No. PCT/CN2012/076942, mailed on Jan. 10, 2013.
(Continued)

*Primary Examiner* — Farah Faroul
(74) *Attorney, Agent, or Firm* — Oppedahl Patent Law Firm LLC

(57) ABSTRACT

This disclosure discloses a multi-version compatible method for storing radio resources. The method includes: receiving a Radio Resource Control (RRC) message sent by a network side; converting the protocol version of the RRC message by using a conversion function to make the converted protocol version of the RRC message consistent with that of a preservation function, when the protocol version of the RRC message is inconsistent with that of the preservation function; storing radio resources in the RRC message by using the preservation function, wherein the protocol version of the RRC message is consistent with that of the preservation function. This disclosure also discloses a multi-version compatible apparatus for storing radio resources. The present disclosure can effectively reduce the amount of codes and complexity of storage resources, reduce the cost for maintaining codes, and be compatible with multiple versions.

11 Claims, 3 Drawing Sheets

(58) Field of Classification Search
USPC .................................................. 370/465–467
See application file for complete search history.

(56) References Cited

U.S. PATENT DOCUMENTS

| | | | |
|---|---|---|---|
| 2003/0069995 A1 | 4/2003 | Fayette | |
| 2004/0052246 A1* | 3/2004 | Jang | H04W 76/068 370/352 |
| 2004/0131078 A1 | 7/2004 | Gupta | |
| 2005/0239461 A1* | 10/2005 | Verma | H04L 29/06 455/435.1 |
| 2008/0240037 A1* | 10/2008 | Bedekar | H04W 92/02 370/331 |
| 2010/0067466 A1* | 3/2010 | Isonuma | H04W 48/10 370/329 |
| 2012/0082137 A1* | 4/2012 | Ito | H04L 27/2647 370/331 |
| 2012/0287902 A1* | 11/2012 | Bufe | H04W 36/0055 370/331 |
| 2015/0264580 A1* | 9/2015 | Iwai | H04W 16/14 370/329 |

OTHER PUBLICATIONS

English Translation of the Written Opinion of the International Search Authority in international application No. PCT/CN2012/076942, mailed on Jan. 10, 2013.
Supplementary European Search Report in European application No. 12874713.6, mailed on Apr. 22, 2015.

* cited by examiner

METHOD AND APPARATUS COMPATIBLE WITH MULTI-VERSION FOR STORING WIRELESS RESOURCE

FIELD

The disclosure relates to the field of mobile communications, and more particularly to a method and apparatus compatible with multiple versions for storing radio resources.

BACKGROUND

The network structure of a Universal Mobile Telecommunications System (UMTS) which is one of 3rd Generation (3G) systems is composed of a core network, a UMTS Terrestrial Radio Access Network (UTRAN), and User Equipment (UE). An interface between the UTRAN and the UE is a wireless interface. On the interface, a protocol stack is divided into a physical layer, a data link layer and a network layer according to its function and task, wherein a Radio Resource Control (RRC) sub-layer, which is located at the lowest level of the network layer, is an access layer mainly configured to provide functions including control and management of radio resources, and etc.

With the development of 3G networks and the progress of 3G technologies, the rate of 3G is also increased constantly. In order to meet the service requirement for high rate, new functions are added to RRC based on the original versions to adapt to wireless source improvement brought about by new technologies. Such modification is embodied by version upgrading of the RRC protocol, e.g. the RRC protocol is upgraded from R4 to R5 in order to support a High Speed Downlink Packet Access (HSDPA) function; the RRC protocol is further upgraded to R7 in order to support a High-Speed Uplink Packet Access (HSUPA) function; recently, the protocol is once again upgraded to the R9 version to support an evolved High Speed Packet Access (HSPA+) function. When radio resources are stored, the radio resources should be stored in a corresponding cell in a protocol. Due to the change in parameters of different protocol versions, RRC messages of different versions have different structures. When the RRC protocol is formulated, a preservation function applicable to the version of the RRC protocol should be compiled for each cell. Preservation functions of various protocol versions cannot be used universally because of different input structures of the functions, which results in incompatibility of the preservation functions and complicated storage of radio resources. In addition, most functions of preservation functions of different versions are similar but incompatible due to different function input structures, which eventually leads to a great amount of seemingly repeated codes that cannot be reused. With the upgrading of versions, the amount of RRC resources storage codes is increasing, and a large amount of codes will cause great adverse impact on the system stability and will also increase the code maintenance cost.

SUMMARY

The disclosure is to describe a multi-version compatible method and apparatus for radio resources storage, which can effectively reduce the amount of codes and complexity of resources storage, reduce the cost for maintaining codes, and be compatible with multiple versions.

The disclosure provides a multi-version compatible method for storing radio resources, wherein the method includes:

receiving a Radio Resource Control (RRC) message sent by a network side;

when the protocol version of the RRC message is inconsistent with that of the preservation function, converting the protocol version of the RRC message by using a conversion function to make the converted protocol version of the RRC message be consistent with that of a preservation function;

storing radio resources in the RRC message by using the preservation function, wherein the protocol version of the RRC message is consistent with that of the preservation function.

The preservation function may be a preservation function of the highest protocol version supported by a terminal.

The conversion function may be in one-to-one correspondence to one or more protocol versions supported by the terminal.

The step of converting the protocol version of the RRC message by using the conversion function may include:

converting the protocol version of the RRC message into a protocol version of a higher level by using a conversion function corresponding to the protocol version of a higher level than the protocol version of the RRC message.

After receiving the RRC message sent by the network side, the method further may include:

decoding the RRC message;

when a decoding failure occurs, reply a state message indicative of the decoding failure of the RRC message to the network side, and wait for the network side to send an RRC message again.

The disclosure further provides a multi-version compatible apparatus for storing radio resources, wherein the apparatus includes a receiving module, a storing module and a converting module, wherein the receiving module is configured to receive an RRC message sent by a network side and send the RRC message to the converting module;

the converting module is configured to convert, when the protocol version of the RRC message sent by the receiving module is inconsistent with that of a preservation function, the protocol version of the RRC message by using a conversion function to make the converted protocol version of the RRC message be consistent with that of the preservation function, and send the converted RRC message to the storing module;

the storing module is configured to receive the converted RRC message sent by the converting module 20, store radio resources in the RRC message by using the preservation function, wherein the protocol version of the RRC message is consistent with that of the preservation function.

The storing module may be configured to use a preservation function of the highest protocol version supported by a terminal as the preservation function.

The converting module may be configured to store the conversion function which is in one-to-one correspondence to one or more protocol versions supported by the terminal.

The converting module may be configured to convert, when the protocol version of the RRC message is inconsistent with that of the preservation function, the protocol version of the RRC message into a protocol version of a higher level by using a conversion function corresponding to the protocol version of a higher level than the protocol version of the RRC message until the converted protocol version of the RRC message is consistent with that of the preservation function.

The multi-version compatible apparatus for storing radio resources further may include a decoding module configured to decode the RRC message, and when a decoding failure occurs, reply a state message indicative of the decoding failure of the RRC message to the network side, and wait for the network side to send an RRC message again.

Through adaptive conversion of the protocol version of an RRC message, the disclosure makes the protocol version of the RRC message be consistent with that of a preservation function, thus realizing compatibility of radio resources of multiple versions, simplifying an RRC protocol preservation function in a terminal system, reducing the complexity of resources storage and the amount of function codes, improving the stability of function codes and reducing the cost for maintaining codes.

The implementation, functional characteristics and advantages of the disclosure will be further described with reference to the accompanying drawings.

DETAILED DESCRIPTION

It should be understood that the embodiments described here are only used for explaining the disclosure, but are not used for limiting the disclosure.

Figure 1:
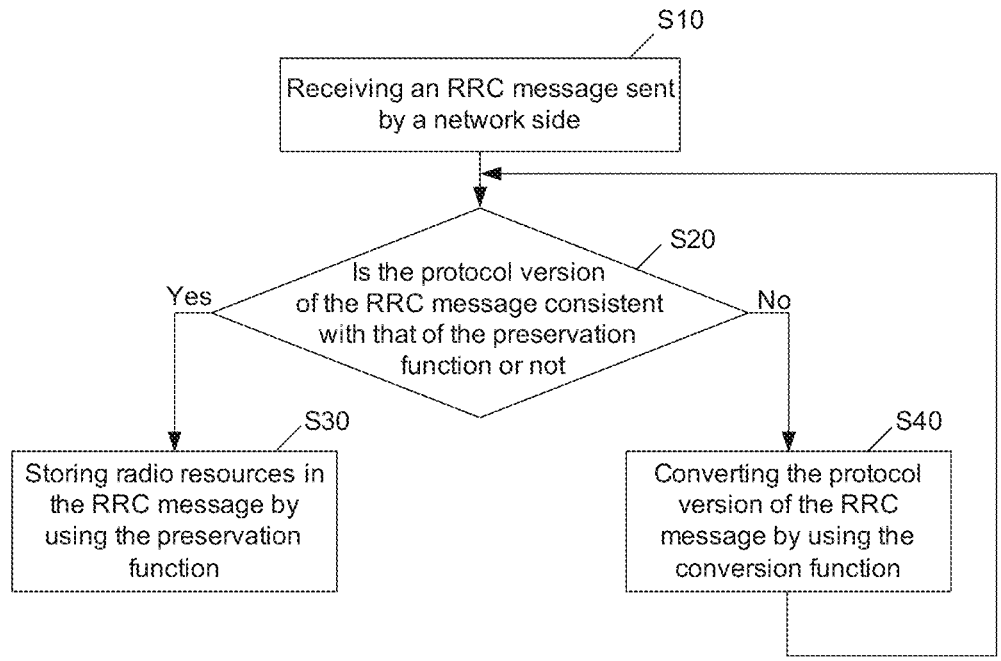
FIG. 1 is a flowchart of a multi-version compatible method for storing radio resources in an embodiment of the disclosure.

As shown in FIG. 1, FIG. 1 is a flowchart of a multi-version compatible method for storing radio resources in an embodiment of the disclosure. The multi-version compatible method for storing radio resources in the embodiment includes:

Step 10: receiving an RRC message sent by a network side;

a terminal of the embodiment communicates with the network side and receives the RRC message sent by the network side; the RRC message includes radio resources and the terminal stores the radio resources;

Step 20: determining whether the protocol version of the RRC message is consistent with that of a preservation function; if consistent, performing Step 30; otherwise, performing Step 40;

in the embodiment, in order to simplify preservation functions of an RRC protocol of the terminal device and reduce the amount of function codes, only one version of preservation function is reserved in the terminal device, e.g. in protocol versions that can be supported by the terminal, a preservation function of one protocol version is selected and reserved in a network layer of the terminal; or each time when the terminal upgrades the RRC protocol, a preservation function of a protocol version before upgrading is replaced by a preservation function of the upgraded protocol version, i.e. a preservation function of the highest protocol version is reserved in the terminal device;

Step 30: storing the radio resources in the RRC message by using the preservation function, and ending the process;

in the embodiment, it is necessary to input the RRC message into the preservation function to store the radio resources in the RRC message; since the input structures of preservation functions of various protocol versions are different, the radio resources can be stored successfully only by inputting an RRC message having a protocol version consistent with that of the preservation function into the preservation function; subsequently, the an access layer of the terminal is controlled to work according to the stored radio resources;

Step 40: converting the protocol version of the RRC message by using a conversion function and performing Step 20;

in the embodiment, for an RRC message having a protocol version inconsistent with that of the preservation function, the protocol version of the RRC message should be converted, e.g. if the protocol version of the preservation function is the highest protocol version R9, then the protocol version of the RRC message is converted into the highest protocol version R9; if the protocol version of the preservation function is R5, then the protocol version of the RRC message is converted into R5.

Through protocol version adaptive conversion of an RRC message, the embodiment makes the protocol version of the RRC message be consistent with that of a preservation function, thus realizing compatibility of radio resources of multiple versions, simplifying an RRC protocol preservation function in a terminal system, reducing the complexity of resources storage and the amount of function codes, improving the stability of function codes and reducing the cost for maintaining codes.

Figure 2:
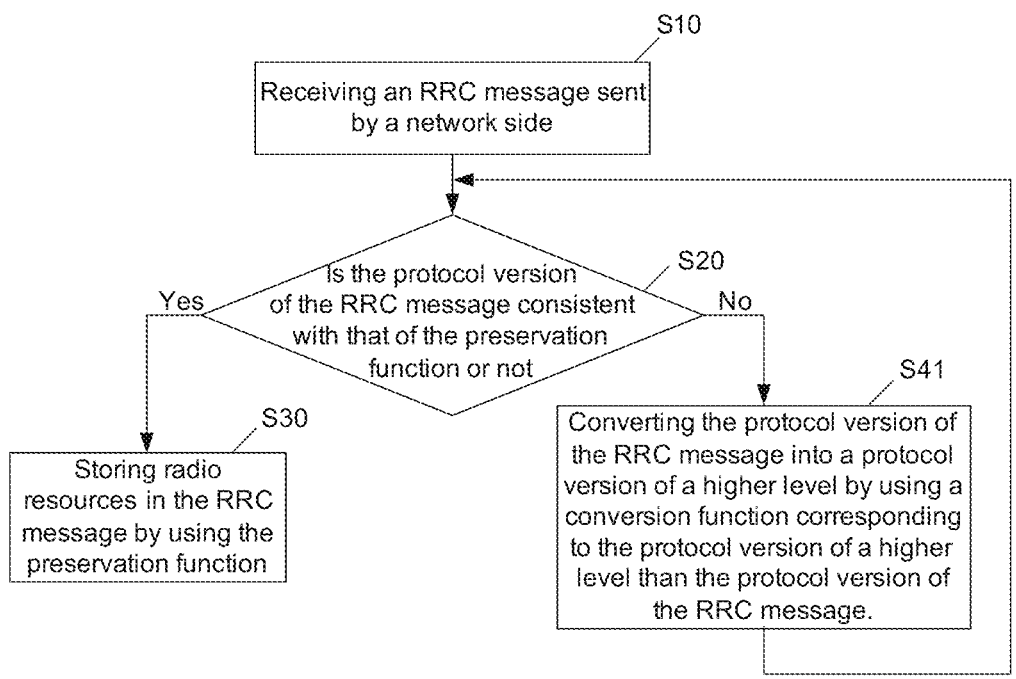
FIG. 2 is a flowchart of a multi-version compatible method for storing radio resources in another embodiment of the disclosure.

As shown in FIG. 2, FIG. 2 is a flowchart of a multi-version compatible method for storing radio resources in another embodiment of the disclosure. Step 40 specifically includes:

Step 41: converting the protocol version of the RRC message into a protocol version of a higher level by using a conversion function corresponding to the protocol version of a higher level than the protocol version of the RRC message;

here, the protocol version of a higher level is a protocol version higher than that of the RRC message in all protocol versions corresponding to the conversion function stored in the terminal, and a protocol version corresponding to the conversion function closest to the protocol version of the current RRC message.

In order to simplify the preservation function and the conversion function, and reduce the amount of function codes in the embodiment, the preservation function is generally a preservation function of the highest protocol version supported by the terminal, and the conversion function converts the RRC message of a lower version into that of a higher function, e.g. a conversion function is provided in each protocol version; the conversion function is used for converting the RRC message, which is one level lower than the conversion function, into the same version as the conversion function, and after protocol upgrading, the conversion function before upgrading is still reserved in an RRC sub-layer of the terminal, i.e. protocol versions of the conversion function should be in one-to-one correspondence to protocol versions supported by the terminal, e.g. if the current protocol version of the terminal is R7, the protocol version of the preservation function is also R7 and the conversion function of the terminal includes two versions:

one is a conversion function of the R7 version, which can convert an RRC message of the R5 version into the R7 version, and the other one is a conversion function of the R5 version, which can convert an RRC message of the R4 version into the R5 version. Specifically, when the protocol version of an RRC message received by the terminal is R4, the RRC message of the R4 version is converted into that of the R5 version by using the conversion function of the R5 version first, then the protocol version of the converted RRC message is compared with that of the preservation function; if the versions are inconsistent, the RRC message of the R5 version is converted into that of the R7 version by using the conversion function of the R7 version subsequently to convert the protocol versions of the RRC message by the conversion function level by level, then the protocol version of the RRC message is consistent with the protocol version of the preservation function at the moment, and the RRC message can be stored by the preservation function of the R7 version. Through upgrading and converting the protocol version of the RRC message level by level by conversion function of various versions, the embodiment makes the protocol version of the RRC message be consistent with that of the preservation function, thus realizing compatibility of radio resources of multiple versions, simplifying RRC protocol preservation functions and conversion functions in a terminal system, reducing the complexity of resources storage and the amount of function codes, improving the stability of function codes and reducing the cost for maintaining codes.

Figure 3:
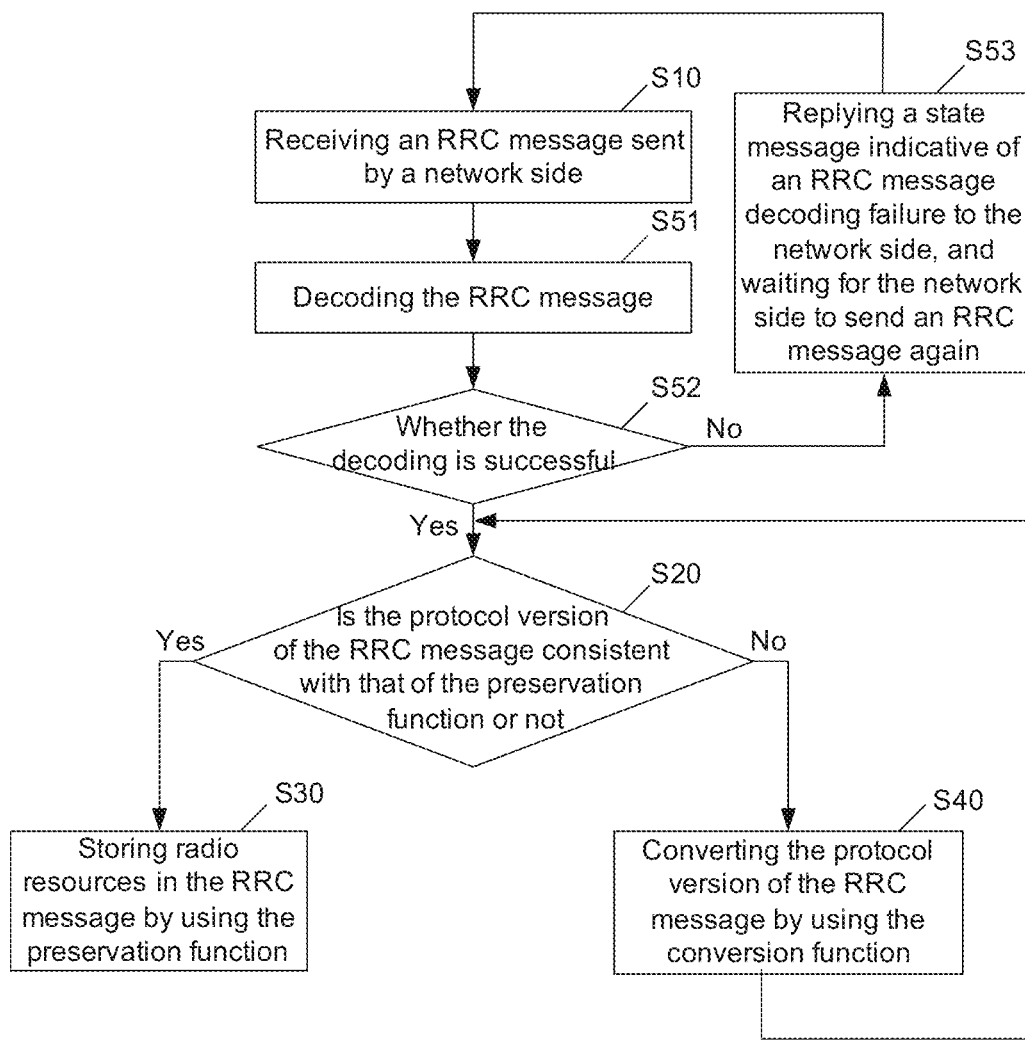
FIG. 3 is a flowchart of a multi-version compatible method for storing radio resources in still another embodiment of the disclosure.

As shown in FIG. 3, FIG. 3 is a flowchart of a multi-version compatible method for storing radio resources in still another embodiment of the disclosure. The following steps are further included after Step 10:

Step 51: decoding the RRC message;

Step 52: determining whether the decoding is successful; if successful, performing Step 20; otherwise, performing Step 53;

Step 53: replying a state message indicative of an RRC message decoding failure to the network side, and waiting for the network side to send an RRC message again; performing Step 10.

By determining whether the decoding is successful, the embodiment avoids a failure in extracting available radio resources from the RRC message decoded unsuccessfully and avoids an error of the access layer of the terminal caused by extraction of invalid radio resources at the same time, thus effectively improving the stability of the terminal.

Figure 4:
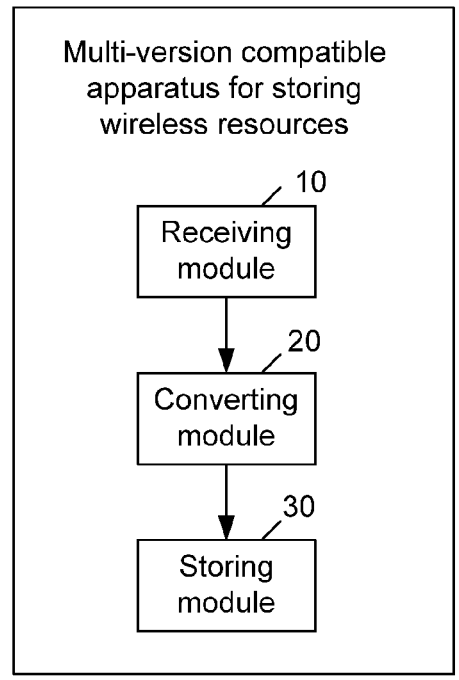
FIG. 4 is a structural diagram of a multi-version compatible apparatus for storing radio resources in an embodiment of the disclosure.

As shown in FIG. 4, FIG. 4 is a structural diagram of a multi-version compatible apparatus for storing radio resources in an embodiment of the disclosure. The multi-version compatible apparatus for storing radio resources in the embodiment includes:

a receiving module 10 configured to receive an RRC message sent by a network side and send the RRC message to a converting module 20;

a converting module 20 configured to convert, if a protocol version of the RRC message sent by the receiving module 10 is inconsistent with that of a preservation function, the protocol version of the RRC message by using a conversion function to make the converted protocol version of the RRC message be consistent with that of the preservation function, and send the converted RRC message to a storing module 30;

a storing module 30 configured to receive the converted RRC message sent by the converting module 20, store radio resources in the RRC message by using the preservation function, wherein the protocol version of the RRC message is consistent with that of the preservation function.

The terminal of the embodiment communicates with the network side, and receives, through the receiving module 10 of the terminal, the RRC message sent by the network side. The RRC message includes radio resources, and the terminal stores available radio resources. In order to simplify preservation functions of an RRC protocol of the terminal device and reduce the amount of function codes, only one version of preservation function is reserved in the storing module 30 of the terminal device, e.g. in protocol versions that can be supported by the terminal, one protocol version is selected and reserved in a network layer of the terminal by the storing module 30; or each time when the terminal upgrades the RRC protocol, a preservation function of a protocol version before upgrading is replaced by a preservation function of the upgraded protocol version by the storing module 30, i.e. a preservation function of the highest protocol version is reserved in the terminal device; when storing the radio resources, the storing module 30 inputs the RRC message into the preservation function; since the input structures of preservation functions of various protocol versions are different, the radio resources can be stored successfully only by inputting an RRC message having a protocol version consistent with that of the preservation function into the preservation function; subsequently, the access layer of the terminal is controlled to work according to the stored radio resources; for an RRC message having a protocol version inconsistent with that of the preservation function, the converting module 20 converts the protocol version of the RRC message, e.g. if the protocol version of the preservation function is the highest protocol version R9, then the converting module 20 converts the protocol version of the RRC message into the highest protocol version R9; if the protocol version of the preservation function is R5, then the converting module 20 converts the protocol version of the RRC message into R5. Through adaptive conversion of protocol versions of an RRC message, the embodiment makes the protocol version of the RRC message be consistent with that of a preservation function, thus realizing compatibility of radio resources of multiple versions, simplifying an RRC protocol preservation function in a terminal system, reducing the complexity of resources storage and the amount of function codes, improving the stability of function codes and reducing the cost for maintaining codes.

The converting module 20 of the embodiment of the disclosure is specifically configured to convert, when the protocol version of the RRC message is inconsistent with that of the preservation function, the protocol version of the RRC message into a protocol version of a higher level by using a conversion function corresponding to the protocol version of a higher level than the protocol version of the RRC message until the converted protocol version of the RRC message is consistent with that of the preservation function.

In the embodiment, in order to simplify the preservation function and the conversion function, and reduce the amount of function codes, the preservation function is generally a preservation function of the highest protocol version supported by the terminal, and based on the conversion function, the RRC message of a lower version is converted into that of a higher function. For example, a conversion function is provided in each protocol version, and the converting module 20 uses the conversion function to convert the RRC message one level lower than the conversion function into the same version as the conversion function, and after protocol upgrading, the conversion function before upgrading is still reserved in an RRC sub-layer of the terminal, i.e. protocol versions of the conversion function should be in one-to-one correspondence to protocol versions supported by the terminal. For example, when the current protocol version of the terminal is R7, the protocol version of the preservation function is also R7 and the conversion function of the terminal includes two versions: one is a conversion function of the R7 version, which can convert an RRC message of the R5 version into that of the R7 version, and the other one is a conversion function of the R5 version, which can convert an RRC message of the R4 version into that of the R5 version; when the protocol version of an RRC message received by the terminal is R4, the converting module 20 converts the RRC message of the R4 version into that of the R5 version by using the conversion function of the R5 version first, then compares the protocol version of the converted RRC message with that of the preservation function; if the versions are inconsistent, the converting module 20 further converts the RRC message of the R5 version into that of the R7 version by using the conversion function of the R7 version subsequently to convert the protocol versions of the RRC message by the conversion function level by level; then the protocol version of the RRC message is consistent with the protocol version of the preservation function at the moment, and the RRC message can be stored by the storing module 30 using the preservation function of the R7 version; through upgrading and converting the protocol version of the RRC message level by level by conversion function of various versions, the embodiment makes the protocol version of the RRC message be consistent with that of the preservation function, thus realizing compatibility of radio resources of multiple versions, simplifying RRC protocol preservation functions and conversion functions in a terminal system, reducing the complexity of resources storage and the amount of function codes, improving the stability of function codes and reducing the cost for maintaining codes.

Figure 5:
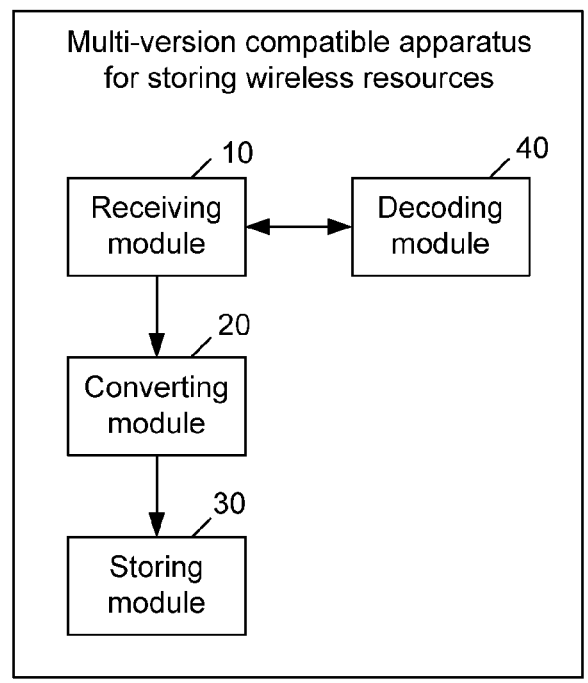
FIG. 5 is a structural diagram of a multi-version compatible apparatus for storing radio resources in another embodiment of the disclosure.

As shown in FIG. 5, FIG. 5 is a structural diagram of a multi-version compatible apparatus for storing radio resources in another embodiment of the disclosure. The multi-version compatible apparatus for storing radio resources of the embodiment of the disclosure further includes a decoding module 40 configured to decode the RRC message, and when a decoding failure occurs, reply a state message indicative of the RRC message decoding failure to the network side, and wait for the network side to send an RRC message again.

The decoding module 40 is specifically configured to decode the RRC message sent by the receiving module 10, and when the decoding failure occurs, reply the state message indicative of the RRC message decoding failure to the network side, and wait for the network side to send the RRC message again; when the decoding succeeds, notify the receiving module 10 to send the RRC message to the converting module 20; correspondingly, the receiving module 10 is further configured to, after receiving the RRC message sent by the network side, send the RRC message to the decoding module 40, and after receiving the notification of sending to the converting module 20 the RRC message sent by the decoding module, send the RRC message to the converting module 20.

By decoding through the decoding module 40 and determining whether the decoding is successful, the embodiment avoids a failure in extracting available radio resources from the RRC message decoded unsuccessfully and also avoids an error of the access layer of the terminal caused by extraction of invalid radio resources, thus effectively improving the stability of the terminal.

What are described above are only preferred embodiments of the disclosure, which cannot limit the patent scope of the disclosure. All equivalent structure or equivalent flow modification made within the specification and content of the accompanying drawings of the disclosure, or direct or indirect application in other related technical fields all shall be included in the patent protection scope of the disclosure.

What is claimed is:

1. A multi-version compatible method for storing radio resources, comprising:
   receiving a Radio Resource Control (RRC) message sent by a network side;
   converting a protocol version of the RRC message by using at least one conversion function to make the converted protocol version of the RRC message consistent with that of a preservation function, when the protocol version of the RRC message is inconsistent with that of the preservation function, wherein converting the protocol version of the RRC message by using the at least one conversion function comprises:
   converting the protocol version of the RRC message into a protocol version of a higher level than the protocol version of the RRC message by using a conversion function corresponding to the protocol version of the higher level until the converted protocol version of the RRC message is consistent with that of the preservation function;
   storing radio resources in the RRC message by using the preservation function, wherein the protocol version of the RRC message is consistent with that of the preservation function.

2. The multi-version compatible method for storing radio resources according to claim 1, wherein the preservation function is a preservation function of a highest protocol version supported by a terminal.

3. The multi-version compatible method for storing radio resources according to claim 2, wherein the at least one conversion function is in one-to-one correspondence to one or more protocol versions supported by the terminal.

4. The multi-version compatible method for storing radio resources according to claim 3, further comprising:
   after receiving the RRC message sent by the network side, decoding the RRC message;
   when a decoding failure occurs, replying a state message indicative of the decoding failure of the RRC message to the network side, and waiting for the network side to send the RRC message again.

5. The multi-version compatible method for storing radio resources according to claim 2, further comprising:
   after receiving the RRC message sent by the network side, decoding the RRC message;
   when a decoding failure occurs, replying a state message indicative of the decoding failure of the RRC message to the network side, and waiting for the network side to send the RRC message again.

6. The multi-version compatible method for storing radio resources according to claim 1, further comprising:
   after receiving the RRC message sent by the network side, decoding the RRC message;
   when a decoding failure occurs, replying a state message indicative of the decoding failure of the RRC message to the network side, and waiting for the network side to send the RRC message again.

7. A multi-version compatible apparatus for storing radio resources, comprising a receiver, a storage and a converter, wherein the receiver receives an Radio Resource Control (RRC) message sent by a network side and sends the RRC message to the converter;

the converter converts, when a protocol version of the RRC message sent by the receiver is inconsistent with that of a preservation function, the protocol version of the RRC message by using at least one conversion function to make the converted protocol version of the RRC message consistent with that of the preservation function, and sends the converted RRC message to the storage, wherein the converter converts, when the protocol version of the RRC message is inconsistent with that of the preservation function, the protocol version of the RRC message into a protocol version of a higher level than the protocol version of the RRC message by using a conversion function corresponding to the protocol version of the higher level until the converted protocol version of the RRC message is consistent with that of the preservation function;

the storage receives the converted RRC message sent by the converter (20), stores radio resources in the RRC message by using the preservation function, wherein the protocol version of the RRC message is consistent with that of the preservation function.

8. The multi-version compatible apparatus for storing radio resources according to claim 7, wherein the storage uses a preservation function of a highest protocol version supported by a terminal as the preservation function.

9. The multi-version compatible apparatus for storing radio resources according to claim 8, wherein the converter stores the at least one conversion function which is in one-to-one correspondence to one or more protocol versions supported by the terminal.

10. The multi-version compatible apparatus for storing radio resources according to claim 9, wherein the apparatus further comprises a decoder which decodes the RRC message, and when a decoding failure occurs, replies a state message indicative of the decoding failure of the RRC message to the network side, and waits for the network side to send the RRC message again.

11. The multi-version compatible apparatus for storing radio resources according to claim 8, wherein the apparatus further comprises a decoder which decodes the RRC message, and when a decoding failure occurs, replies a state message indicative of the decoding failure of the RRC message to the network side, and waits for the network side to send the RRC message again.

* * * * *